Aug. 15, 1967 P. H. LIVINGSTON 3,335,885
DUMPING VEHICLE FOR SLAG POTS AND THE LIKE
Filed Oct. 23, 1965

INVENTOR.
Patrick H. Livingston
BY
Harness, Dickey & Pierce
ATTORNEYS.

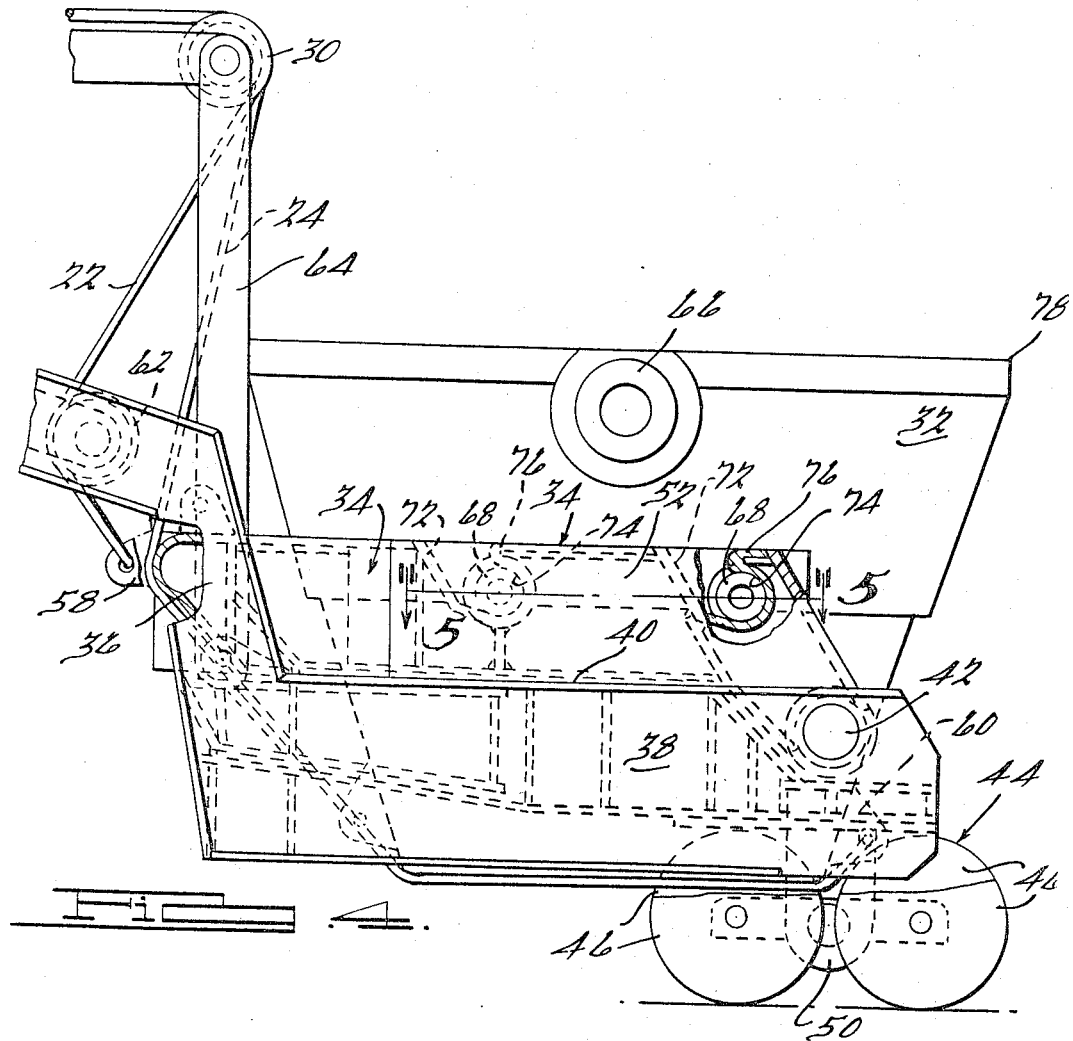

United States Patent Office 3,335,885
Patented Aug. 15, 1967

3,335,885
DUMPING VEHICLE FOR SLAG POTS
AND THE LIKE
Patrick H. Livingston, Detroit, Mich., assignor to Edw. C. Levy Company, Detroit, Mich., a corporation of Michigan
Filed Oct. 23, 1965, Ser. No. 503,281
2 Claims. (Cl. 214—314)

This invention relates to vehicles for transporting and dumping large vessels such as slag pots and the like, and particularly to a rearwardly dumping vehicle capable of movement over pavement and other road surfaces.

It is an object of the present invention to provide a dumping vehicle for large vessels which is capable of dumping the vessel rearwardly clear of the rear wheels of the vehicle, yet which will carry a substantial portion of the weight of the vessel on the front wheels.

It is still another object of the present invention to provide a rearwardly dumping vehicle capable of tilting a vessel to an extreme angle in which all of the contents of the vessel tend to be discharged therefrom by gravity and there is a minimal tendency of the contents of the vessel to stick in the vessel.

It is still another object of the present invention to provide a vehicle for transporting and dumping slag pots or the like in which the slag pot may be removed from the vessel and deposited on the ground in an inverted position without the necessity of an overhead or mobile crane.

The present invention relates to a vehicle of the general type disclosed in Esgate United States patent application, Ser. No. 226,301, filed Sept. 5, 1963, and the structure disclosed herein comprises an improvement in the general type of vehicle disclosed therein. It is, therefore, a further object of the present invention to further improve and render more efficient and useful the type of vehicle disclosed in said Esgate patent application.

These and other objects of the invention will become apparent from the following detailed description taken in conjunction with the accompanying drawings, wherein:

FIG. 4 is an enlarged sectional view of the structure illustrated in FIG. 2 taken along the line 4—4 thereof; and FIG. 5 is a sectional view of the structure illustrated in FIG. 4, taken along the line 5—5 thereof.

Figure 1:
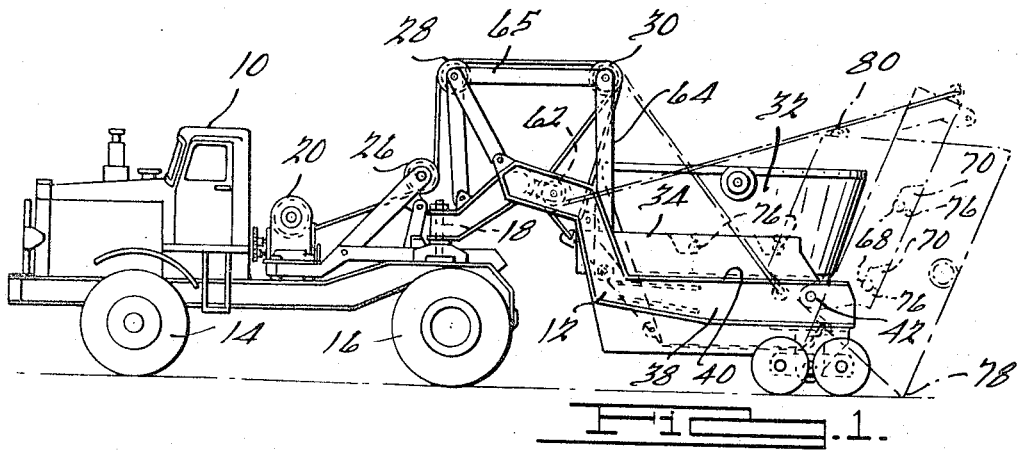
FIGURE 1 is a side elevational view of a vehicle made in accordance with the present invention.
Figure 2:
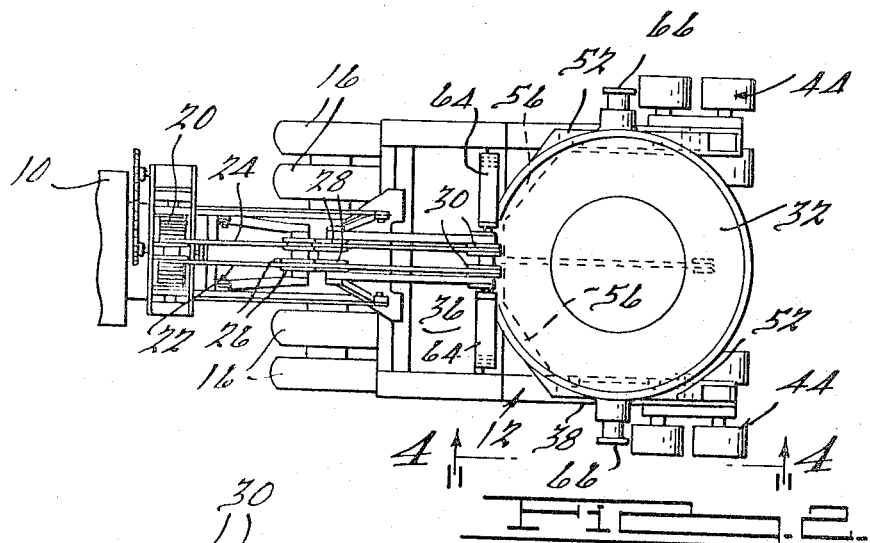
FIG. 2 is a fragmentary plan view of the structure illustrated in FIG. 1.
Figure 3:
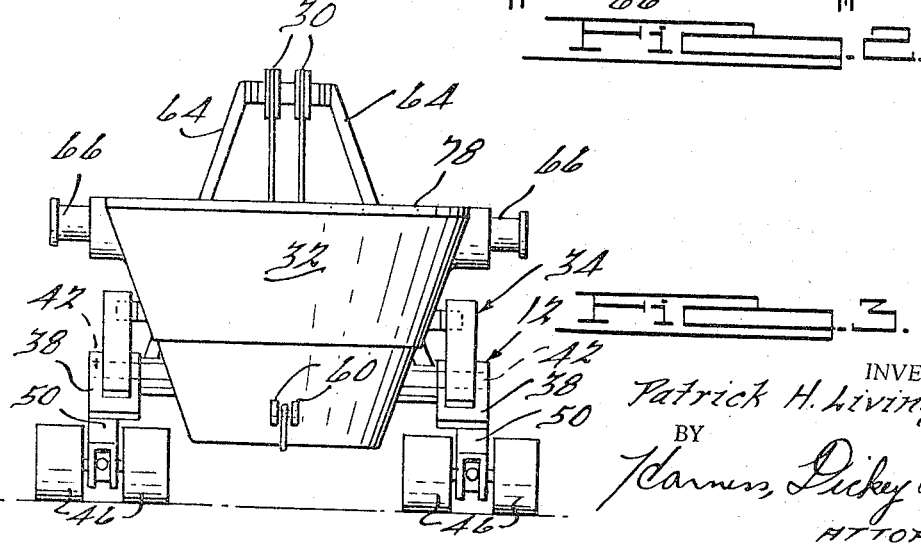
FIG. 3 is a rear elevational view of the structure illustrated in FIGS. 1 and 2.

Referring now to the drawings, it will be seen that the vehicle illustrated herein is of an articulated construction, comprising a tractor 10 and a trailer 12. It will be appreciated, of course, that a vehicle embodying the principles of the present invention could be made as a single truck, if desired. The tractor 10 is illustrated as having front ground-engaging wheels 14 and a second set of ground-engaging wheels 16 disposed rearwardly of the wheels 14. The tractor 10 carries a kingpin 18 on which the forward end of the trailer 12 is pivotally supported. The tractor 10 also carries a winch 20 for operating a pair of cables 22 and 24. The winch 20 is shown as a double winch, containing two spools for independently operating the cables 22 and 24. The cables 22 and 24 pass from the winch 20 under a pair of idler pulleys 26 and thence upwardly over a second pair of idler pulleys 28 to a third pair of idler pulleys 30 disposed immediately above the forward edge of a vessel in the form of a slag pot 32 supported on the trailer 12. The slag pot 32 is supported on the trailer 12 through a tilting bed or frame member 34 pivotally connected on the trailer 12 at the rear end thereof.

The trailer 12 includes an upwardly extending frame portion 36 at the forward end thereof and a pair of parallel frame side rails 38 disposed parallel to one another and extending rearwardly from the frame portion 36. The frame side rails 38 define an open space therebetween which is unobstructed at the rear end of the trailer and in the area beneath the slag pot 32. The frame side rails 38 provide coplanar horizontal upper surfaces 40 on which the tilting bed member 34 rests. A pair of fixed shafts 42 are positioned one on each of the side frame members 38 adjacent the rear end thereof and serve as journal bearings for the tilting bed 34. Each shaft 42 is positioned above a wheel assembly 44. Each of the wheel assemblies 44 has four ground-engaging wheels 46 that are connected to the side rail members 38 through several pivoting joints in such a manner that the wheels 46 can roll over various irregularities in the ground surface while maintaining engagement with the ground. It will be seen that the wheels 46 are connected to the side rails 38 by a supporting strut 50 depending from each side frame member 38. As a result, all of the wheels 46 are located beneath the side rails 38.

Turning now to the tilting bed 34, it will be seen that the bed 34 has a pair of parallel laterally spaced side portions 52, each provided with a downwardly and rearwardly depending leg 54 at the rear end thereof. Each leg 54 is journaled on one of the shafts 42 to provide a pivot axis for the bed 34. At the forward ends of the side portions 52 of the tilting bed 34 are a pair of angle frame members 56 which are connected at their forward ends. The angle members 56 carry a pair of apertured ears 58 to which the cable 22 is connected. The other cable 24 passes between the ears 58, under the slag pot 32, and is connected at its end to a pair of ears 60 formed integrally on the rear said of the slag pot 32. The cable 22 passes around a pulley 62 rotatably supported on the forward frame portion 36 of the trailer 12, while the cable 24 passes directly from the pulley 30 downwardly around the tilting bed 34 and around the bottom of the slag pot 32. The pulleys 30 are supported at the upper ends of arms 64 which are supported at their lower ends on the forward frame portion 36 of the trailer 12.

The slag pot 32 is provided with a pair of enlarged oppositely outwardly extending stub shafts 66 adapted to receive the hooks of an overhead crane (not shown), and by means of which the slag pot may be lifted off the tilting bed 34. In addition, a pair of longitudinally spaced projections 68 extend outwardly from diametrically opposite sides of the vessel and the slag pot 32 beneath the shafts 66. All four pins 68 are disposed parallel to one another, and one pin on each side is disposed in axial alignment with a pin 68 on the opposite side. The pins 68 have circular cylindrical outer peripheries and are received in curved slots or recesses 70 formed in the side frame portions 52 of the tilting bed 34. The slots 70 have an upwardly open upper end portion 72 which is of a dimension longitudinally of the trailer greater than the diameter of the projections 68. The slots 70 extend downwardly and rearwardly a distance greater than the diameter of the projections 68 to an undercut slot portion 74 which is disposed rearwardly of the upper end portions 72 of the slots 70 so that a shoulder 76 of each side frame member 52 lies vertically above at least a portion of each projection 68 as it rests in the undercut slot portion 74 of its slot 70.

The operation of the device of the present invention in dumping the contents of the pot 32 will be fairly obvious from the foregoing description. The pot is dumped by pulling on the cable 22 to cause the forward end of the tilting bed 34 to be raised upwardly. When the cable 22 has been pulled tight, the cable 24 is then pulled to continue the movement of the bed 34 in a rearwardly and downwardly pivoting direction. Of course, the tilting bed 34 pivots about the axis of the shafts 42. As is clearly shown in FIGURE 1, the pot 32 may be pivoted so that a lip 78 defined by its upper outer periphery will engage the ground substantially to the rear of the wheels 46. By this means the hot slag or other contents of the vessel of the pot 32 are dumped rearwardly clear of the wheels 46 to prevent damage to said wheels. It will also be seen that the angle of the conical side wall of the pot is disposed to an angle to the ground of about 50 to 55°. By this means the slag or other contents of the pot 32 will tend to run freely out of the pot onto the ground. When in the fully tipped position, the shoulders 76 engage the projections 68 on the rear sides thereof to prevent the pins 68 from coming out of the slots 70.

In previous dumping vehicles for slag pots, some difficulty has been experienced in tipping the pot to an angle sufficient to cause all of the slag to run freely out of the pot. As a result, "skulls" of hardened slag tended to stick in the pot, which were difficult to remove. By the use of the dumping vehicle of the present invention, the frequency of having to use special procedures to remove sticking contents from the slag pot 32 is substantially reduced. However, should it be necessary to totally remove the slag pot 32 from the bed 34 for the removal of a hardened "skull," this can be done in the field without the use of an overhead crane. The method used to accomplish this is to connect a cable to a pair of ears 80 located on the lower forward side of the slag pot 32 and to connect the other end of this cable to a bulldozer or other track laying vehicle. The bulldozer then pulls on this cable to cause the slag pot to pivot about that portion of its lip 78 which engages the ground. This lifts the projections 68 out of the slots 70 and the slag pot 32 will fall over onto its open upper end. The ability of the slag pot to be separated from the vehicle and turned upside down in this manner is a highly desirable feature which is used to remove a hardened "skull." This eliminates the need for having an expensive crane or the like available for removing the slag pot 32 from the trailer 34 when this is required.

While it might be possible to provide a pivot location for the slag pot 32 which would not require the use of a tilting bed 34 or the like, such an arrangement would of necessity locate the slag pot 32 substantially rearwardly of the position on the trailer 32 in which it is located in the present invention, and a substantially greater portion of the weight of the slag pot 32 and its contents would be borne by the rear wheel assemblies 44. However, the present invention is particularly characterized by the fact that a substantial portion of the weight of the slag pot and its contents are carried by the wheels 16 of the tractor. This is because the tilting bed 32 rests on the surfaces 40 of the side rails 38 of the trailer frame in locations disposed forwardly of the wheel assemblies 44. This is extremely desirable in enabling the vehicle of the present invention to be used over paved road surfaces without causing such road surfaces to break up and deteriorate with great frequency. A vehicle made in accordance with the present invention may well have a combined gross weight of 50 tons, and it can be readily appreciated that such a weight would tend to have a very deleterious effect on a paved road if the weight were not properly distributed. Accordingly, the tilting bed 34 of the construction illustrated herein serves the combined function of permitting a substantial portion of the weight of the slag pot 32 and the slag carried therein to be carried by the vehicle 16, yet enables the slag pot to be dumped rearwardly clear of the wheels 46 and enables the slag pot 32 to be tilted to an extreme angle which is greater than prior devices of a similar nature.

While the preferred embodiment of the invention illustrated herein is well calculated to fulfill the objects above stated, it will be apparent the invention is susceptible to modification, variation and change without departing from the fair meaning or intended scope of the subjoined claims.

What is claimed is:

1. A vehicle for transporting large vessels including a frame having a pair of rearwardly extending frame elements defining a rearwardly open space therebetween and provided with upwardly facing supporting surfaces, ground-engaging wheels supporting said frame elements adjacent the rear ends thereof, a tilting bed arranged to rest on said supporting surfaces and having a pair of integral depending portions at the rear ends thereof, means connecting the lower ends of said depending portions to said frame for pivotal movement about a pivot axis located beneath the level of said supporting surfaces, a vessel positioned between said frame elements and having a pair of laterally outwardly extending projections on opposite sides thereof, recess means formed on said bed operable to receive said projections for supporting said vessel on said bed, said recess means being located forwardly of the pivot axis of said bed, and means for tilting said bed whereby said vessel will move upwardly and rearwardly to dump its contents rearwardly of said wheels.

2. A vehicle for transporting large vessels including a frame having a pair of laterally spaced rearwardly extending frame members defining a rearwardly open space therebetween and provided with upwardly facing supporting surfaces, ground-engaging wheels supporting said elements adjacent the rear ends thereof, a tilting bed arranged to rest on said supporting surfaces and having a pair of integral depending portions at the rear end thereof, means connecting the lower ends of said depending portions to said frame for pivotal movement about a pivot axis located beneath the level of said supporting surfaces, a vessel located between said frame elements and having a pair of laterally outwardly extending projections on the opposite sides thereof, recess means formed on said bed operable to receive said projections for supporting said vessel on said bed, said recess means having means engageable with said projections to prevent said projections from coming out of said recess means when said bed is tilted to a substantially vertical position and means for tilting said bed upwardly and rearwardly to a substantially vertical position whereby said vessel will dump its contents rearwardly of said wheels.

References Cited

UNITED STATES PATENTS

| | | | |
|---|---|---|---|
| 3,083,850 | 4/1963 | Owen | 214—390 |
| 3,107,797 | 10/1963 | McFeaters et al. | 214—314 X |
| 3,237,988 | 3/1966 | Esgate | 298—5 |

HUGO O. SCHULZ, *Primary Examiner.*